(12) United States Patent
Desjoyeaux et al.

(10) Patent No.: US 12,315,486 B2
(45) Date of Patent: May 27, 2025

(54) METHOD FOR CREATING ALVEOLAR CORES HAVING OPEN INNER CONICAL SHAPES

(71) Applicant: Safran Nacelles, Gonfreville l'Orcher (FR)

(72) Inventors: Bertrand Desjoyeaux, Moissy Cramayel (FR); Marc Versaevel, Moissy Cramayel (FR); Mathieu Preau, Moissy Cramayel (FR); Laurent Moreau, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 490 days.

(21) Appl. No.: 17/460,933

(22) Filed: Aug. 30, 2021

(65) Prior Publication Data
US 2021/0390940 A1 Dec. 16, 2021

Related U.S. Application Data

(63) Continuation of application No. PCT/FR2020/050384, filed on Feb. 27, 2020.

(30) Foreign Application Priority Data

Feb. 28, 2019 (FR) ..................................... 19/02109

(51) Int. Cl.
*G10K 11/168* (2006.01)
*B29D 24/00* (2006.01)
(Continued)

(52) U.S. Cl.
CPC .......... *G10K 11/168* (2013.01); *B29D 24/005* (2013.01); *B32B 3/12* (2013.01);
(Continued)

(58) Field of Classification Search
CPC .. G10K 11/168; G10K 11/172; B29D 24/005; B32B 3/12; B32B 3/266;
(Continued)

(56) References Cited

U.S. PATENT DOCUMENTS 4,265,955 A * 5/1981 Harp ....................... B32B 15/06
428/116
6,220,388 B1 * 4/2001 Sanborn ................ E04B 9/0457
181/290
(Continued)

FOREIGN PATENT DOCUMENTS

GB 1470036 4/1977

OTHER PUBLICATIONS

Office Action issued in corresponding EP Application 20719677.5, issued Dec. 9, 2022, and an English Translation, 14 pages.
(Continued)

*Primary Examiner* — Forrest M Phillips
*Assistant Examiner* — Jennifer B. Olson
(74) *Attorney, Agent, or Firm* — Burris Law, PLLC

(57) ABSTRACT

A method for manufacturing a sound attenuating panel uses an alveolar-core structure including a first edge and a second edge separated by alveolar cells, the alveolar cells including walls extending from the first and second edges and defining a primary conduit for the circulation of a sound wave that is to be attenuated. The method includes covering the first edge or the second edge of the alveolar-core structure with a compartmentation wall; deforming the compartmentation wall to define at least one secondary conduit for the circulation of a sound wave that is to be attenuated, the secondary conduit extending at least partially within said primary conduit; and creating an opening in the compartmentation wall to permit communication between the primary and secondary conduits.

11 Claims, 4 Drawing Sheets

(51) Int. Cl.
*B32B 3/12* (2006.01)
*B32B 3/26* (2006.01)
*B32B 5/02* (2006.01)
*B32B 27/12* (2006.01)
*B32B 27/40* (2006.01)
*B64D 33/02* (2006.01)
*F02K 1/82* (2006.01)

(52) U.S. Cl.
CPC .............. *B32B 3/266* (2013.01); *B32B 5/026* (2013.01); *B32B 27/12* (2013.01); *B32B 27/40* (2013.01); *B32B 2250/03* (2013.01); *B32B 2250/04* (2013.01); *B32B 2307/102* (2013.01); *B64D 33/02* (2013.01); *B64D 2033/0206* (2013.01); *F02K 1/827* (2013.01)

(58) Field of Classification Search
CPC ......... B32B 5/026; B32B 27/12; B32B 27/40; B32B 2250/03; B32B 2250/04; B32B 2307/102; B32B 5/02; B32B 3/30; B32B 3/18; B64D 33/02; B64D 2033/0206; F02K 1/827; Y02T 50/60
USPC ........................................................ 181/292
See application file for complete search history.

(56) References Cited

U.S. PATENT DOCUMENTS

| | | | | |
|---|---|---|---|---|
| 6,274,216 | B1 * | 8/2001 | Gonidec | B32B 5/02 428/116 |
| 7,510,052 | B2 * | 3/2009 | Ayle | F02C 7/24 181/290 |
| 8,397,865 | B2 * | 3/2013 | Douglas | G10K 11/172 181/292 |
| 8,413,761 | B2 * | 4/2013 | Ayle | F02C 7/045 181/292 |
| 9,016,430 | B2 * | 4/2015 | Ichihashi | G10K 11/162 244/123.13 |
| 9,469,985 | B1 | 10/2016 | Ichihashi | |
| 9,643,392 | B2 * | 5/2017 | Butler | B32B 27/06 |
| 10,280,839 | B2 * | 5/2019 | Riou | F02C 7/045 |
| 11,151,971 | B2 * | 10/2021 | Vyas | B32B 3/266 |
| 2013/0062143 | A1 | 3/2013 | Ichihashi | |
| 2015/0027629 | A1 | 1/2015 | Butler et al. | |
| 2015/0041247 | A1 | 2/2015 | Ichihashi | |
| 2015/0041248 | A1 * | 2/2015 | Ichihashi | F02K 1/827 29/896.2 |
| 2016/0009067 | A1 | 1/2016 | Gerken et al. | |

OTHER PUBLICATIONS

Office Action issued in corresponding EP Application 20719677.5, issued Jun. 29, 2023, and an English Translation, 16 pages.
International Search Report for International Application PCT/FR2020/050384, mailed Jul. 10, 2020.
English Translation of International Search Report for International Application PCT/FR2020/050384, mailed Jul. 10, 2020.
English Translation of an Office Action issued in corresponding CN Application 202080017210.5, issued Jan. 2, 2024, 14 pages.

* cited by examiner

METHOD FOR CREATING ALVEOLAR CORES HAVING OPEN INNER CONICAL SHAPES

CROSS-REFERENCE TO RELATED APPLICATIONS

This application is a continuation of International Application No. PCT/FR2020/050384, filed on Feb. 27, 2020, which claims priority to and the benefit of FR 19/02109, filed on Feb. 28, 2019. The disclosures of the above applications are incorporated herein by reference.

FIELD

The present disclosure relates to a method for manufacturing an alveolar core structure for an acoustic attenuation panel. The present disclosure further relates to an alveolar core structure for an acoustic attenuation panel, obtained from the manufacturing method according to the present disclosure, as well as an acoustic attenuation panel including an alveolar core structure according to the present disclosure.

BACKGROUND

The statements in this section merely provide background information related to the present disclosure and may not constitute prior art.

Aircraft turbojet engines can generate significant noise. There are efforts at reducing this noise, more particularly as the turbojet engines used are becoming more and more powerful. The design of the nacelle surrounding a turbojet engine largely contributes to the reduction of this noise.

In order to increase the acoustic performance of aircraft, the nacelles are fitted with acoustic attenuation panels aimed at attenuating noises due to the circulation of air flow through the turbojet engine as well as to vibrations of the structures of the nacelle.

The acoustic attenuation panels are sandwich-type structures well known to absorb these noises. These panels usually include an alveolar core structure which may be in the form of an alveolar layer comprising alveolar cells (a structure commonly called "honeycomb").

The alveolar core structure is generally coated on one of its faces with an air-impermeable skin, called a "solid" skin and, on the other of its faces, with an "acoustic" skin, pierced with a plurality of acoustic holes defining an acoustic pattern.

Such acoustic attenuation panels constitute acoustic resonators adapted to "trap" the noise and therefore to attenuate the sound emissions towards the outside of the nacelle. These acoustic attenuation panels equip areas of the nacelle which, for example, could be the air inlet of the nacelle, the inner fixed structure (IFS) of the nacelle, surrounding the core of the turbojet, the blocking flaps of a cascade thrust reverser device.

In order to acoustically attenuate the low frequencies, it is known to form an acoustic attenuation panel whose alveolar core structure includes one or several superimposed alveolar layer(s), separated by a septum, of increased total height.

Nonetheless, the increase in thickness of the acoustic panel increases its weight, which goes against the resolution of the general technical challenge specific to aeronautics of reducing the weight of the aircraft.

Another known configuration for acoustically attenuating the low frequencies comprises forming in each alveolar cell of the alveolar core structure a cone, the cone being open at its base.

By providing for such cones, the length of the path traveled by the sound wave that enters the acoustic panel is increased compared to the distance that would be traveled without these cones, yet without increasing the thickness of the panel as is the case with two-stage alveolar core structures separated by a septum.

A configuration of this type is, for example, described in U.S. Published Application No. 2015/0041247 A1 and U.S. Published Application No. 2015/0041248 A1. These documents disclose cones that are placed in the alveolar core structure, in particular by welding. The manufacture of these cones inside the alveolar cells is extremely complex, and the time for the manufacture of the alveolar core structure is quite long. Also, an alveolar core structure manufactured by this method is expensive.

SUMMARY

This section provides a general summary of the disclosure and is not a comprehensive disclosure of its full scope or all of its features.

The present disclosure relates to a method for manufacturing an alveolar core structure for an acoustic attenuation panel, said alveolar core structure comprising a first edge and a second edge separated by a plurality of alveolar cells, at least one of said plurality of alveolar cells comprising a plurality of walls extending from said first edge up to said second edge and defining a primary duct for circulating a sound wave to be attenuated, said method comprising the following steps:

at least partially covering one of said first edge or said second edge of said alveolar core structure with a compartmentalization wall;

deforming said compartmentalization wall to define at least one secondary duct for circulating said sound wave to be attenuated, said secondary duct extending at least partially inside said primary duct; and forming at least one opening within said compartmentalization wall to enable communication between said primary duct and said secondary duct.

Thus, by using a compartmentalization wall which is deformed to define at least one secondary duct for circulating the sound wave to be attenuated extending at least partially inside said primary duct, it is possible to form as many secondary circulation ducts as the alveolar structure has primary circulation ducts.

The complexity and the cost of manufacturing the secondary circulation ducts are considerably reduced compared with the known solutions which provide for the secondary ducts to be made independently of one another.

It should be understood that during the step in which one of said first edge and said second edge of said alveolar core structure is at least partially covered with a compartmentalization wall, a plurality of alveolar cells is covered with the compartmentalized wall.

For example, in one form, all of the alveolar cells of the alveolar core structure are covered with the compartmentalization wall.

It should be understood that the step during which the compartmentalization wall is deformed to define at least one secondary duct for circulating said sound wave to be attenuated, said secondary duct extending at least partially inside said primary duct, is subsequent to the step in which one of said first edge and second edge of said alveolar core structure is at least partially covered with a compartmentalization wall.

According to variations of this manufacturing method of the present disclosure, which may be implemented individually or in combination:

the compartmentalization wall comprises a deformable and expandable film, and the manufacturing method comprises an additional step subsequent to the step of deforming said compartmentalization wall, of consolidating said compartmentalization wall in its deformed position;

the film of the compartmentalization wall is reinforced by a deformable and expandable textile structure;

the opening is formed in the compartmentalization wall before or after or simultaneously with the step aiming at deforming said compartmentalization wall;

the step of deforming the compartmentalization wall is obtained by mechanical deformation of said compartmentalization wall by a mechanical deformation device comprising at least one deformation member designed to exert a pressure or a tension on one of the faces of the compartmentalization wall;

the opening is formed in the compartmentalization wall simultaneously with the step of deforming said compartmentalization wall and said opening is formed by a punch mounted on the deformation member of the mechanical deformation device;

the step of deforming the compartmentalization wall is obtained by applying a differential pressure on either side of said compartmentalization wall; and the compartmentalization wall adopts in its deformed position an ogive-like, conical or frustoconical shape.

The present disclosure also relates to an alveolar core structure for an acoustic attenuation panel, obtained from the manufacturing method according to the present disclosure, wherein the deformed compartmentalization wall rests on one of the first edge and the second edge of the alveolar core structure.

The present disclosure also relates to an acoustic attenuation panel including an acoustic skin pierced with a plurality of acoustic holes defining an acoustic pattern, a solid skin and an alveolar core structure according to the present disclosure, disposed between said acoustic skin and said solid skin.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
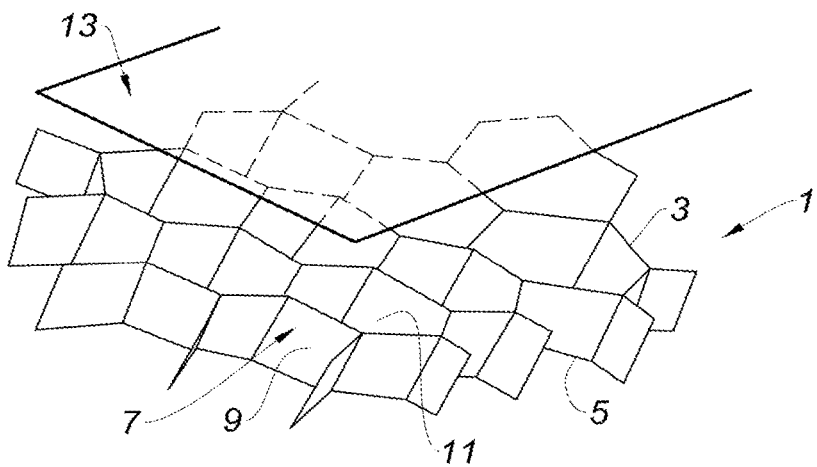
FIG. 1 illustrates an alveolar structure according to the present disclosure, during manufacture.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
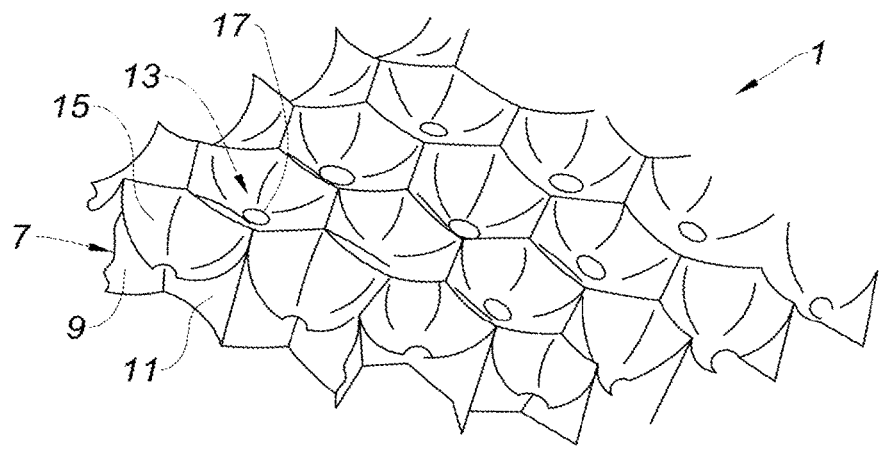
FIG. 2 illustrates an alveolar structure obtained by a manufacturing method according to the present disclosure.

Reference is made to FIGS. 1 and 2, illustrating an alveolar core structure 1 during manufacture and in its configuration as obtained after application of the manufacturing method of the present disclosure, respectively.

The alveolar core structure comprises a first edge 3 and a second edge 5, the first edge 3 and the second edge 5 being separated by a plurality of alveolar cells 7.

Each of the plurality of alveolar cell 7 comprises a plurality of walls 9 extending transversely between the first edge 3 and the second edge 5 of the alveolar core structure. The walls 9 of the alveolar cell 7 extend from the first edge 3 up to the second edge 5 of the alveolar core structure 1. The walls 9 define a primary duct 11 for circulating a sound wave to be attenuated, from a sound source. For example, the sound source emitting sound waves to be attenuated may be a turbojet engine of an aircraft propulsion assembly.

According to a first step of the manufacturing method of the present disclosure, the first edge 3 of the alveolar core structure 1, in the deployed position as illustrated in FIG. 1, is completely or partially covered with a compartmentalization wall 13. According to an alternative (shown in FIG. 12), the compartmentalization wall partially or totally covers not the first edge 3 of the alveolar core structure, but the second edge 5 of the alveolar core structure.

The compartmentalization wall 13 may also be referred to herein as a "septum" because of its function in the alveolar structure, as will be seen in the remainder of the disclosure. According to a second step of the manufacturing method of the present disclosure, the compartmentalization wall 13 is deformed to define a secondary duct 15 (shown in FIG. 2) for the circulation of the sound wave to be attenuated. The secondary duct 15 extends at least partially inside the primary duct 11 defined by the walls 9 of the alveolar cell 7. The secondary duct thus obtained by the compartmentalization wall 13 defines a septum in the alveolar cell 7.

According to a third step of the manufacturing method of the present disclosure, which can be carried out before, during or after the step of deforming the compartmentalization wall 13, at least one opening 17 is formed within the compartmentalization wall. 13. A communication is then created between the primary duct 11 and the secondary duct 15.

A "secondary duct" or "cone" or "tapered duct" or "ogival" alveolar core structure 1 is then obtained, as represented in FIG. 2, with reference to the geometric shape that the compartmentalization wall 13 adopts in its deformed position.

Figure 3:
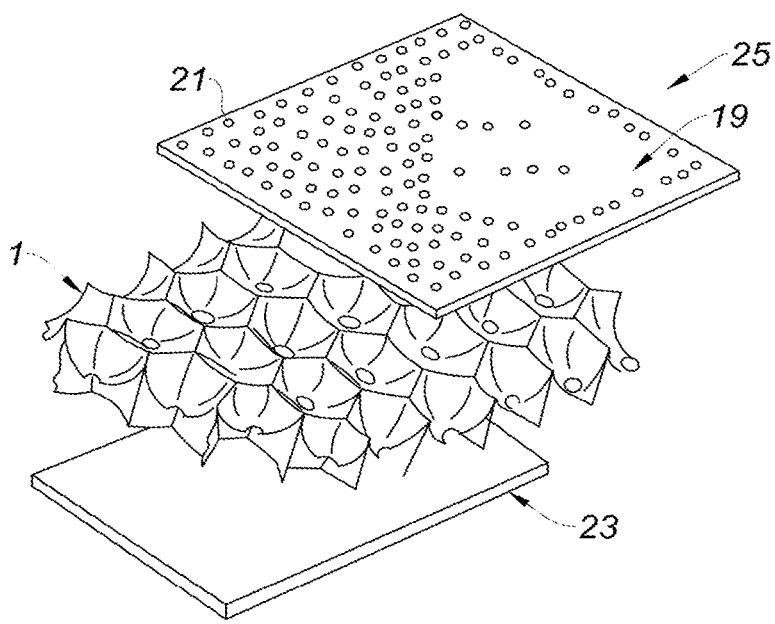
FIG. 3 illustrates an acoustic attenuation panel according to the present disclosure, in an exploded view.

Referring now to FIG. 3, the alveolar core structure 1 thus manufactured is intended to be coated at one of its edges, for example the first edge 3 as illustrated in FIG. 3, with an acoustically permeable skin 19, said acoustically permeable skin is pierced with a plurality of acoustic holes 21 defining an acoustic pattern, and on the other of its edges, for example the second edge 5, with a solid skin 23, said solid skin is reflective to acoustic waves. The assembly thus formed by the alveolar core structure 1 sandwiched between the acoustic skin 19 and the solid skin 23 forms an acoustic attenuation panel 25 represented in FIG. 3 in an exploded view.

Figure 4:
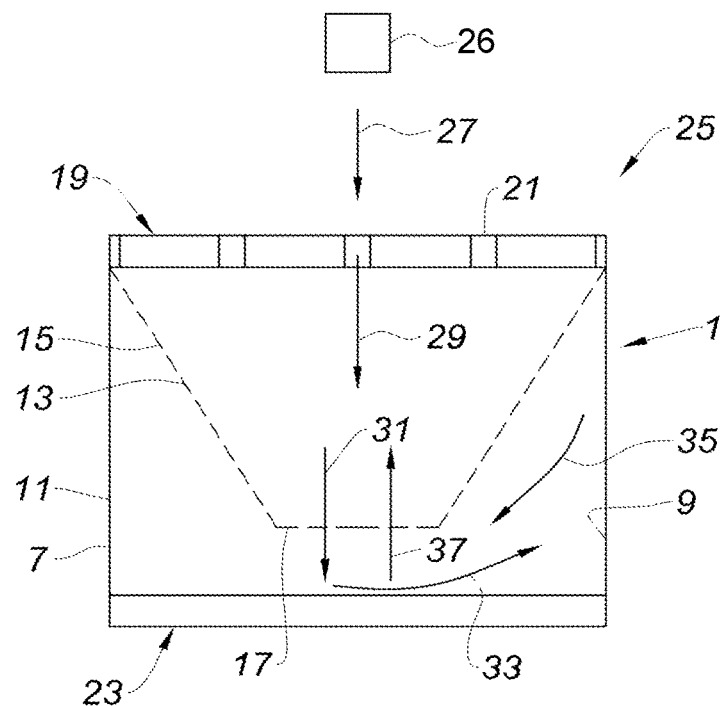
FIG. 4 illustrates the acoustic attenuation panel of FIG. 3 in a partial longitudinal section.

Reference is made to FIG. 4 illustrating a partial longitudinal sectional view of the acoustic attenuation panel 25 of FIG. 3, mounted in an environment in which a sound source 26, for example an aircraft turbojet engine, emits sound waves 27 to be attenuated.

The sound wave 27 enters the alveolar cell 7 through the acoustic holes 21 formed in the acoustic skin 19 (arrow 29).

The sound wave passes through the secondary duct 15 defined by the compartmentalization wall 13, then the sound wave leaves the secondary duct 15 through the opening 17 formed in the compartmentalization wall 13 (arrow 31).

The sound wave then penetrates inside the primary duct 11 before being first reflected by the solid skin 23 (arrow 33) then by the wall 9 of the alveolar cell 7 (arrow 35).

The path traveled by the sound wave 27 is increased compared to the path traveled by a sound wave in an acoustic attenuation panel that would not include such secondary ducts, yet without increasing the thickness of the alveolar core structure, as compared to configurations using a separation septum between two layers of an alveolar core structure.

By increasing the distance traveled by the sound wave, the sound intensity of the wave decreases. Afterwards, the attenuated sound wave 27 comes out again through the opening 17 of the secondary duct (arrow 37).

Because of such an alveolar core structure, the acoustic attenuation performance is increased, in particular at low frequencies.

As a result of using a one-piece compartmentalization wall, which is deformed to form a secondary circulation duct inside a primary circulation duct defined by the walls of an alveolar cell, the complexity of manufacturing the secondary circulation ducts is reduced compared to configurations which provide for secondary ducts, inside the primary ducts, obtained independently of one another.

Also, the cost of manufacturing this type of "secondary duct" alveolar core structures is reduced compared to these configurations.

Figure 5:
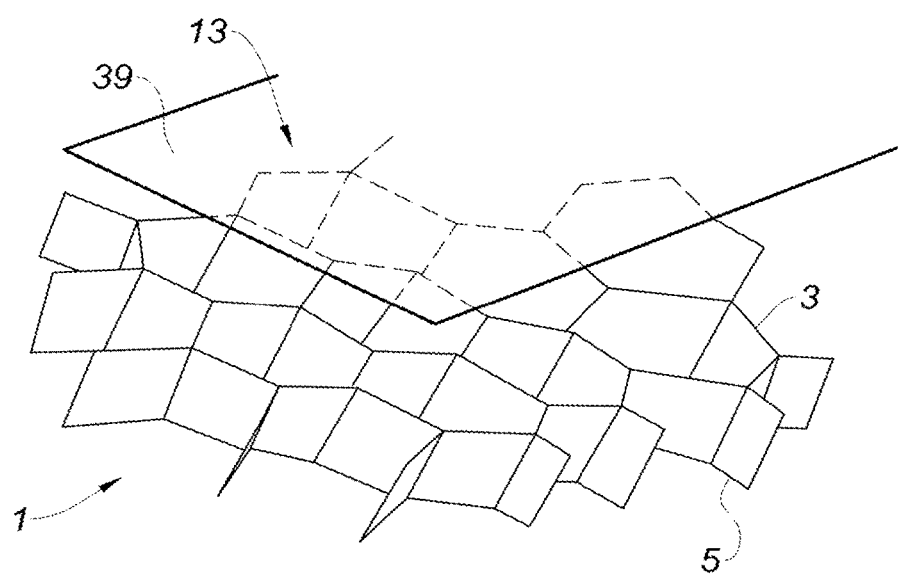
FIG. 5 illustrates a first variation of the manufacturing method according to the present disclosure.

According to a first variation of the manufacturing method of the present disclosure, illustrated in FIG. 5, the compartmentalization wall 13 comprises a deformable and expandable film 39, adapted to be solidified.

According to one form, the film 39 comprises an organic material of the thermosetting, thermoplastic or elastomer type.

The film 39 has, according to a first variant, a high elongation at break, for example comprised between about 10% and about 300%. This is the case, for example, with polyurethane films or elastomers.

The film 39 has, according to a second variant, a low elongation at break, for example of the range of a few percent. This is the case, for example, with films obtained from polymerized epoxy or phenolic resins.

The manufacturing method according to the present disclosure comprises an additional step subsequent to the step of deforming the compartmentalization wall 13 formed by the film 39 of consolidating the compartmentalization wall in its deformed position.

In the case of a film 39 formed by a thermosetting or elastomeric material, the film is not crosslinked until after the step of deformation and consolidation of the compartmentalization wall formed by the film 39 are accomplished.

The film is thus crosslinked when the compartmentalization wall is in its deformed position according to which it defines at least one secondary duct extending at least partially inside at least one primary duct.

In the case of a film 39 obtained by a thermoplastic material, the film is first thermally fluidized after it covers at least partially one of the first and second edges 3, 5 of the alveolar core structure 1 to allow its deformation. Once the step of deforming the compartmentalization wall formed by the film 39 is accomplished, the step of consolidating the compartmentalization wall in its deformed position is performed.

According to another variant of the film 39, the latter comprises an inorganic material, for example a metallic or ceramic material. No step of consolidating the compartmentalization wall 13 after the step of deforming it has been accomplished is then desired.

The step of covering one of the edges of the alveolar core structure with the compartmentalization wall defined by the film 39 is accomplished by installing the film 39 on one edge of the alveolar core structure 1 alone.

Alternatively, this step can be accomplished when the alveolar core structure is already glued to one of the skins of the sound attenuation panel.

Figure 6:
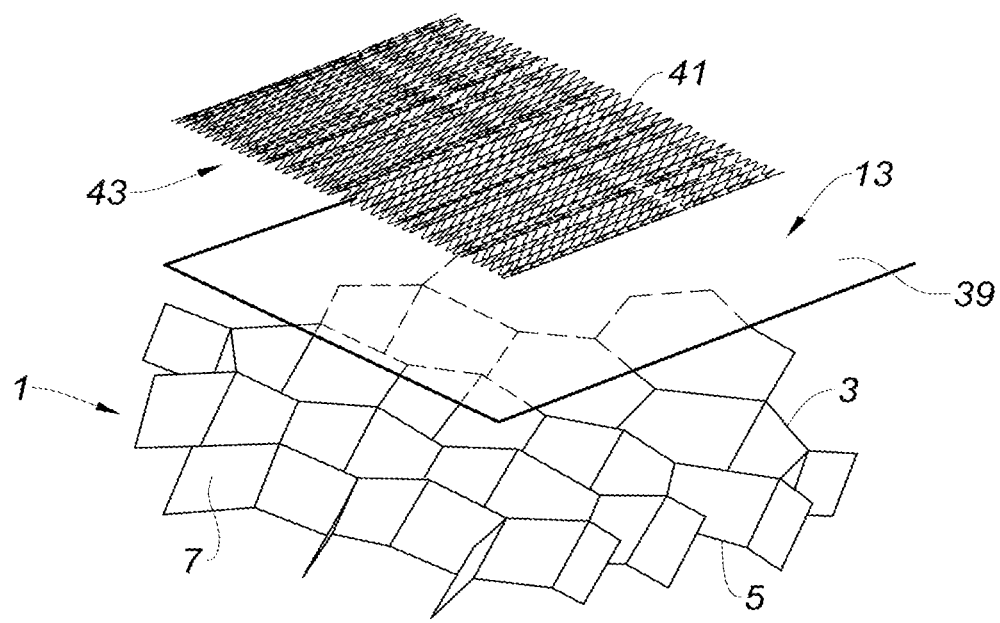
FIG. 6 illustrates a second variation of the manufacturing method according to the present disclosure.

According to a second variation of the manufacturing method of the present disclosure, illustrated in FIG. 6, the compartmentalization wall 13 comprises the deformable and expandable film 39, adapted to be solidified, reinforced by a textile structure 41 which is also deformable and expandable. The textile structure is, for example, chosen to have an elongation capacity comprised between about 100% and about 400% of its length at rest.

According to this second variation, the film 39 constitutes a matrix of the composite material 43 formed by the film or matrix 39 and by the textile structure 41.

When the film or matrix 39 is made of a thermoplastic material, the matrix is thermally fluidized before covering at least part of one of the first and second edges 3, 5 of the alveolar core structure 1. Once the fluidized matrix 39 impregnates the textile structure 41, the matrix 39 is expanded and the composite material 43, defining the compartmentalization wall 13, is deformed to define at least one secondary duct extending at least partially inside the primary duct.

Alternatively, the matrix 39 is mixed beforehand with the textile structure 41, to form a pre-impregnated composite material 43. The composite material 43, defining the compartmentalization wall 13, is then deformed to define at least one secondary duct extending at least partially inside the primary duct.

When the film or matrix 39 is made from a thermosetting or elastomeric material, the matrix is not crosslinked until the textile structure 41 has been infiltrated by the matrix.

The manufacturing method of the present disclosure includes an additional step subsequent to the step of deforming the compartmentalization wall 13, here defined by the composite material 43, of consolidating the compartmentalization wall in its deformed position.

In one form, the textile structure 41 for reinforcing the film 39 has a texture such that its elongation capacity is finished under the effect of the applied deformation. The amplitude of the film 39 is defined as a function of the dimension of the alveolar cells 7 of the alveolar core structure to be manufactured, to form in each alveolar cell a bell shape.

Also, the textile structure 41 is elastic. The elasticity of the textile structure 41 is obtained from elastic textile fibers and due to the type of mesh produced. To this end, the textile structure has a mesh of continuous fibers linked together by knitting or crochet pattern.

According to another form, the mesh is continuous by rows linked mesh by mesh.

According to yet another form, the mesh is of discontinuous or net type and linked by group of meshes.

The fibers of the textile structure 41 are made from an organic material such as nylon, polyesters, polyamides.

Alternatively, the fibers are made from a metallic or mineral material.

The step of covering one of the edges of the alveolar core structure by the compartmentalization wall defined by the film or matrix 39 reinforced by the textile structure 41 is accomplished by installing the film or matrix 39 reinforced by the textile structure 41 on one edge of the alveolar core structure 1 alone. Alternatively, this step can be accomplished when the alveolar core structure is already glued to one of the skins of the sound attenuation panel.

Figure 7:
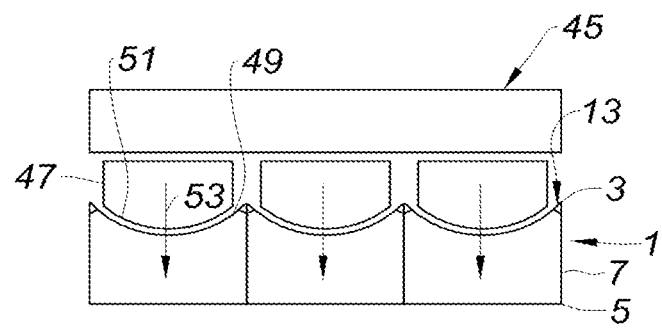
FIG. 7 illustrates a first form of the first variation of the step of deforming the compartmentalization wall according to the present disclosure.
Figure 8:
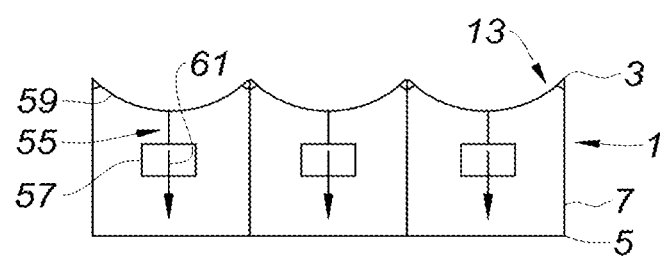
FIG. 8 illustrates a second form of the first variation of the step of deforming the compartmentalization wall according to the present disclosure.

Reference is made to FIGS. 7 and 8 illustrating a first variant of the step of deforming the compartmentalization wall 13 to define at least one secondary duct 15 for the circulation of the sound wave to be attenuated.

The step of deforming the compartmentalization wall 13 can be obtained by mechanical deformation of the compartmentalization wall 13 formed by the film 39 or by the film or matrix 39 reinforced by the textile structure 41.

According to a first form illustrated in FIG. 7, the mechanical deformation can be obtained by a mechanical deformation device 45 including a plurality of deformation members 47 designed to exert a pressure on a face 49 of the compartmentalization wall 13.

The deformation member 47 comprises a block having a curved lower face 51 intended to impart the desired shape to the compartmentalization wall 13.

To this end, the deformation member 47 is dimensioned to be able to penetrate inside the alveolar cell 7.

During the activation of the mechanical deformation device 45, the deformation members 47 move according to the arrows 53, to push the compartmentalization wall 13 initially disposed flat on the edge 3 of the alveolar core structure 1 towards the second edge 5 of the alveolar cells 7.

According to a second form illustrated in FIG. 8, the mechanical deformation can be obtained by a mechanical deformation device 55 including a plurality of deformation members 57 each being connected to a face 59 of the compartmentalization wall 13 which is located inside the alveolar core structure when the compartmentalization wall 13 is positioned on the alveolar core structure 1.

The activation of the mechanical deformation device 55 causes a displacement of the deformation members 57, according to the arrows 61, said members then exert a tension on the compartmentalization wall 13 thus deforming said wall towards the second edge 5 of the alveolar core structure 1 opposite to the edge 3 on which said compartmentalization wall is initially disposed.

According to an arrangement common to the first and second forms of the mechanical deformation device, the deformation members 47, 57 may operate synchronously, which makes it possible to deform the compartmentalization wall 13 in the alveolar cells simultaneously. This makes it possible to deform the compartmentalization wall 13 in one single step.

Alternatively, the deformation members 47, 57 can operate asynchronously, which makes it possible to deform the compartmentalization wall 13 in the alveolar cells non-simultaneously. This can be interesting when the shape desired to be imparted to the compartmentalization wall once deformed varies from one alveolar cell to another.

According to a second variant not represented, the step of deforming the compartmentalization wall is obtained by applying a differential pressure on either side of the compartmentalization wall.

According to a first form, the application of a differential pressure on the compartmentalization wall is obtained by forming two separate partitioned volumes adapted to be pressurized, on either side of the compartmentalization wall.

The deformable and expandable film 39 can be used to partition in this way the volumes defined on either side of the compartmentalization wall.

When the film 39 is reinforced by the textile structure 41, the film 39 is chosen to maintain a sufficient viscosity during the deformation step of the method, in order to keep forming a waterproof barrier with the textile structure 41.

Alternatively, a deformable waterproof membrane applied along the compartmentalization wall may be installed in addition to the film 39. The waterproof membrane is chosen to be non-adherent to the film 39. The waterproof membrane is removed at the end of the deformation step.

According to a second form, the application of a differential pressure on the compartmentalization wall 13 is obtained by forming a depression exerted on the side of the face 59 (shown in FIG. 8) of the compartmentalization wall. The depression can be obtained by drawing a partial air vacuum, the depression level varying according to the geometric parameters and the used materials.

According to a third form, the application of a differential pressure on the compartmentalization wall 13 is obtained by blowing pressurized fluid on the face 49 (shown in FIG. 7) of the film 39 of the compartmentalization wall 13.

According to a third variant not represented, the step of deforming the compartmentalization wall is obtained by a "spinforming" method or by a "centrifugation forming" method, a method according to which the alveolar core structure is rotated, causing deformation of the compartmentalization wall by centrifugal force.

According to a fourth variant not represented, the step of deforming the compartmentalization wall is obtained by magnetic deformation or electromagnetic deformation.

According to a common arrangement applicable to all variants of carrying out the step of deforming the compartmentalization wall 13 in the alveolar cell 7, the deformation of the compartmentalization wall is applied until the consolidation of the said compartmentalization wall is obtained, at least when consolidation of the film 39 of said wall is desired, as is the case when it is made of an organic material.

Figure 9:
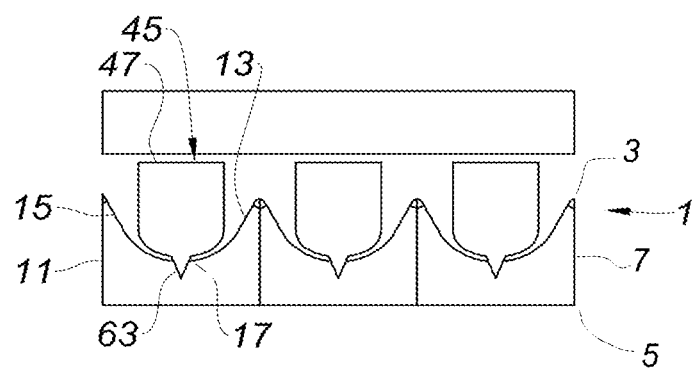
FIG. 9 illustrates a first variant of the step of forming an opening within the compartmentalization wall according to the present disclosure.

Reference is made to FIG. 9 illustrating a first variant of the step of forming an opening 17 within the compartmentalization wall 13 to enable communication between the primary duct 11 and the secondary duct 15.

According to this first variant, the opening is formed in the compartmentalization wall 13 simultaneously with the step of deforming the compartmentalization wall.

The opening 17 can be obtained by mounting a punch 63 on the deformation member 47 of the mechanical deformation device 45. Thus, by displacing the deformation member 47, the punch 63 forms an opening in the compartmentalization wall 13.

According to an alternative not represented, the use of an outer piercing device, which can be used regardless of the implemented deformation method and regardless of the form of the compartmentalization wall 13 adopted, could be considered. For this purpose, the outer piercing device may for example include a punch mounted on an automated arm, or comprise a stamping device or a laser cutting device.

The piercing device is further designed to make it possible to position the openings 17 at distinct locations from one alveolar cell to another, as a function of the geometric deviations of the alveolar cells.

Figure 10:
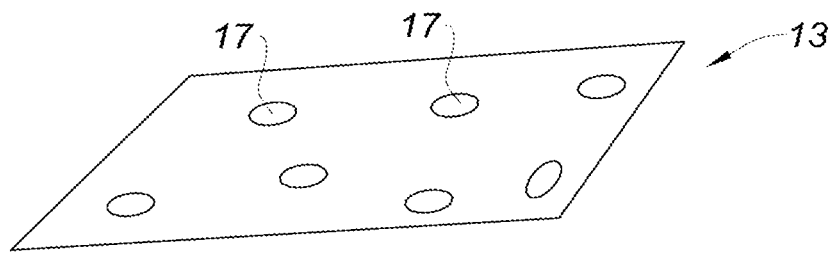
FIG. 10 illustrates a second variant of the step of forming an opening within the compartmentalization wall according to the present disclosure.

Reference is made to FIG. 10 illustrating a second variant of the step of forming openings 17 within the compartmentalization wall 13 to enable communication between the primary duct and the secondary duct.

According to this second variant, the opening is formed in the compartmentalization wall 13 prior to the step of deforming said wall.

This variant is also applicable regardless of the implemented deformation method and regardless of the adopted form of the compartmentalization wall 13.

For example, when the compartmentalization wall 13 includes a film or matrix reinforced by the textile structure, the textile structure is linked to provide for openings 17 which are not coated with film or matrix.

Also, the mesh of the textile structure can be organized to create, by lengthening the connecting meshes therebetween, the openings 17 in the compartmentalization wall 13.

The positioning of the openings 17 on the compartmentalization wall can be chosen so that the openings have a positioning in the alveolar cell which can vary from one alveolar cell to another, as a function of the geometric deviations of the alveolar cells.

According to a third variant, not represented, of the step of forming an opening within the compartmentalization wall to enable communication between the primary duct and the secondary duct, the opening is formed in the compartmentalization wall subsequently to the step of deforming said compartmentalization wall.

The opening can be obtained using an outer piercing device which can be used regardless of the implemented deformation method and regardless of the retained form of the compartmentalization wall.

For this purpose, the outer piercing device may for example include a punch mounted on an automated arm, or comprise a stamping device or a laser cutting device.

The piercing device is also designed to allow the openings to be positioned at distinct locations from one alveolar cell to another, depending on the geometric deviations of the alveolar cells.

According to a common arrangement applicable to all variants of carrying out the step of forming an opening within the compartmentalization wall to enable communication between the primary duct and the secondary duct, the opening can be formed at a top of the deformed compartmentalization wall to form a top opening. When the deformed compartmentalization wall adopts the shape of a cone in an alveolar cell, after having formed the opening, a frustoconical compartmentalization wall is obtained in the alveolar cell. An opening can also be formed, instead of or in addition to the top opening, at a side wall of the compartmentalization wall. Regardless of the location of the opening, the latter defines an acoustic neck which allows a sound wave to pass between the primary and secondary ducts.

Figure 11:
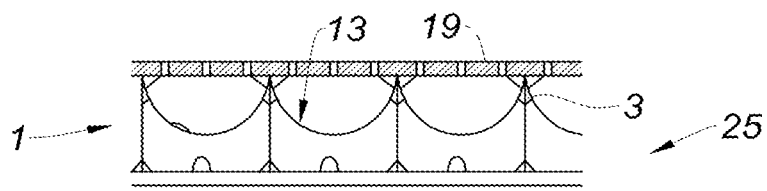
FIG. 11 illustrates a first form of the installation of a compartmentalization wall in an acoustic attenuation panel according to the present disclosure.
Figure 12:
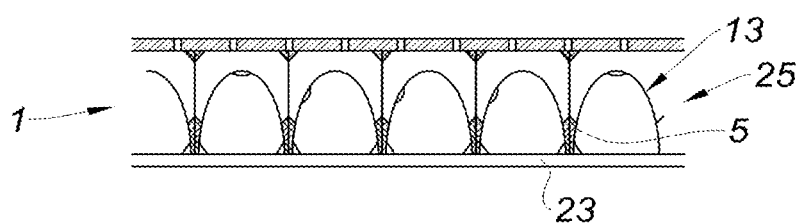
FIG. 12 illustrates a second form of the installation of a compartmentalization wall in an acoustic attenuation panel according to the present disclosure.

Reference is made to FIGS. 11 and 12 providing two examples of a compartmentalization wall 13 installed in an acoustic attenuation panel 25 including the alveolar core structure 1 obtained according to the manufacturing method of the present disclosure.

As represented in FIG. 11, the compartmentalization wall 13 bears against the first edge 3 of the alveolar core structure 1, the edge on which the acoustic skin 19 is mounted. Adhesion is obtained due to the diffusion of the film which adheres to the foil of the alveolar core structure. The compartmentalization wall 13 is in some way anchored at the edge 3, that is to say on the side of the acoustic skin 19.

According to a variant represented in FIG. 12, the compartmentalization wall 13 bears against the second edge 5 of the alveolar core structure 1, the edge on which the solid skin 23 is mounted. Adhesion is also obtained due to the diffusion of the film which adheres to the foil of the alveolar core structure and the compartmentalization wall 13 is in some way anchored at the second edge 5, that is to say on the side of the solid skin 23.

Figure 13:
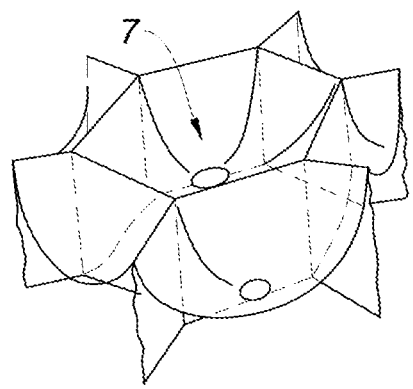
FIG. 13 illustrates a first form of an alveolar cell of an alveolar core structure according to the present disclosure.
Figure 14:
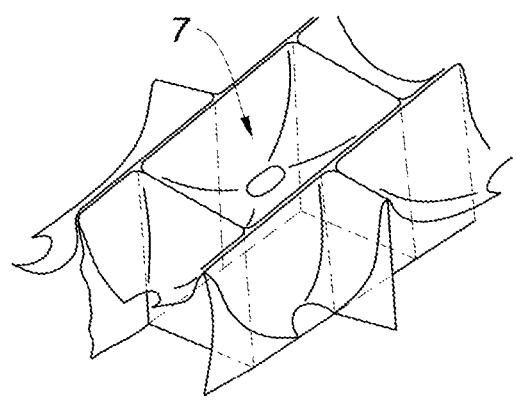
FIG. 14 illustrates a second form of an alveolar cell of an alveolar core structure according to the present disclosure.

Reference is made to FIGS. 13 and 14 providing two examples of the geometry of alveolar cells 7 of an alveolar core structure 1 obtained according to the manufacturing method of the present disclosure. As a non-limiting example, the alveolar cells can adopt the shape of a hexagon as represented in FIG. 13 or of a quadrilateral as represented in FIG. 14. Of course, the alveolar cells can adopt a polygonal shape other than those represented, a circular shape, or an elliptical shape.

The acoustic attenuation panel obtained by mounting a solid skin and an acoustic skin on either side of the alveolar core structure can, in particular but not limited to, equip an aircraft, in particular a propulsion assembly for an aircraft, more particularly a nacelle for an aircraft turbojet engine, and even more particularly an area of the nacelle which can be the air inlet of the nacelle, the inner fixed structure of the nacelle, the locking flaps of a cascade thrust reverser device.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A manufacturing method for manufacturing an alveolar core structure for an acoustic attenuation panel, the alveolar core structure comprising a first edge and a second edge separated by a plurality of alveolar cells, each of the plurality of alveolar cells comprising a plurality of walls extending between the first edge and the second edge and defining a primary duct for circulating a sound wave to be attenuated, wherein the manufacturing method comprises:
at least partially covering the first edge of the alveolar core structure with a compartmentalization wall such that the compartmentalization wall covers at least two of the primary ducts;
deforming the compartmentalization wall from the first edge so as to form at least two secondary ducts extending from the first edge in the at least two of the primary ducts, the compartmentalization wall remaining as a single piece after the deforming, and the at least two secondary ducts are empty; and
forming openings within the compartmentalization wall so as to enable communication between each secondary duct and a respective one of the at least two of the primary ducts.

2. The manufacturing method according to claim 1, wherein the compartmentalization wall includes a deformable and expandable film, and wherein the manufacturing method further comprises, subsequent to deforming the compartmentalization wall, consolidating the compartmentalization wall in its deformed position.

3. The manufacturing method according to claim 2, wherein the deformable and expandable film of the compartmentalization wall is reinforced by a deformable and expandable textile structure.

4. The manufacturing method according to claim 1, wherein the openings are formed in the compartmentalization wall before the deforming the compartmentalization wall.

5. The manufacturing method according to claim 1, wherein the openings are formed in the compartmentalization wall after the deforming the compartmentalization wall.

6. The manufacturing method according to claim 1, wherein the openings are formed in the compartmentalization wall simultaneously with the deforming the compartmentalization wall.

7. The manufacturing method according to claim 1, wherein the deforming of the compartmentalization wall is obtained by mechanical deformation of the compartmentalization wall by a mechanical deformation device comprising at least one deformation member configured to exert one of a pressure and a tension on one face of the compartmentalization wall.

8. The manufacturing method according to claim 7, wherein the openings are formed in the compartmentalization wall simultaneously with the deforming the compartmentalization wall and the openings are formed by a punch mounted on the at least one deformation member of the mechanical deformation device.

9. The manufacturing method according to claim 1, wherein the deforming the compartmentalization wall is obtained by applying a differential pressure on either side of the compartmentalization wall.

10. The manufacturing method according to claim 1, wherein the compartmentalization wall has one of an ogive-like, a conical, and a frustoconical shape in its deformed position.

11. The manufacturing method according to claim 1, wherein the at least two secondary ducts each comprise a first end disposed inside a respective one of the at least two of the primary ducts and a second end opposite the first end, the openings are formed proximate the first end and the second end is open.

* * * * *